United States Patent [19]

Giometti et al.

[11] Patent Number: 4,837,707

[45] Date of Patent: Jun. 6, 1989

[54] CONTAINER INSPECTION APPARATUS

[75] Inventors: Stephen M. Giometti; Timothy W. Shay, both of Horseheads, N.Y.

[73] Assignee: Emhart Industries, Inc., Indianapolis, Ind.

[21] Appl. No.: 270,414

[22] Filed: Nov. 8, 1988

Related U.S. Application Data

[63] Continuation of Ser. No. 946,411, Dec. 24, 1986, abandoned.

[51] Int. Cl.⁴ ............................................. G01M 3/26
[52] U.S. Cl. ................................. 364/552; 364/558; 73/49.2
[58] Field of Search ............... 364/558, 552, 550, 509, 364/507, 478, 473; 73/49.2 R, 45.2, 40, 37

[56] References Cited

U.S. PATENT DOCUMENTS

| | | |
|---|---|---|
| 1,884,942 | 10/1932 | Widell . |
| 1,971,065 | 8/1934 | Dieter . |
| 2,345,387 | 3/1944 | Elsey ........................................ 73/40 |
| 2,407,062 | 9/1946 | Darrach . |
| 3,247,707 | 4/1966 | Tatro . |
| 3,374,887 | 3/1968 | Paruolo et al. ..................... 209/530 |
| 3,390,569 | 7/1968 | McMeekin . |
| 3,413,841 | 12/1968 | Weber . |
| 3,461,716 | 8/1969 | Thomson . |
| 3,495,441 | 2/1970 | Laub . |
| 3,496,761 | 2/1970 | Powers, Jr. ......................... 73/45.2 |
| 3,650,146 | 3/1972 | Bakunovic . |
| 3,683,677 | 8/1972 | Harris . |
| 3,717,248 | 2/1973 | Scribner . |
| 3,751,973 | 8/1973 | Strauss et al. . |
| 3,762,213 | 10/1973 | Nowicki . |
| 3,771,649 | 11/1973 | Strauss . |
| 3,805,593 | 4/1974 | Sandoz et al. . |
| 3,805,594 | 4/1974 | Hayashi . |
| 3,894,424 | 7/1975 | Taylor et al. ....................... 73/49.2 |
| 4,019,370 | 4/1977 | Allocco, Jr. ......................... 73/857 |
| 4,055,985 | 11/1977 | Munz ................................... 73/49.2 |
| 4,061,014 | 12/1977 | Bott et al. ............................ 73/45.1 |
| 4,089,208 | 5/1978 | Franks et al. ....................... 73/45.5 |
| 4,107,130 | 10/1979 | Borror et al. ....................... 73/49.1 |
| 4,278,173 | 7/1981 | Pemberton et al. ............... 209/522 |
| 4,291,573 | 9/1981 | Richter et al. ...................... 73/37 |
| 4,399,916 | 8/1983 | Richter et al. .................... 209/559 |
| 4,459,843 | 7/1984 | Durham ................................ 73/37 |
| 4,490,800 | 12/1984 | Powers ............................... 364/478 |
| 4,587,619 | 5/1986 | Converse, III et al. ........... 364/552 |
| 4,640,122 | 2/1987 | Heraud et al. ................. 73/49.2 R |
| 4,670,847 | 6/1987 | Furuse ............................... 364/507 |
| 4,715,214 | 12/1987 | Tueter et al. ...................... 73/49.2 |

FOREIGN PATENT DOCUMENTS

| | | | |
|---|---|---|---|
| 1853540 | 4/1987 | Fed. Rep. of Germany . | |
| 2075202 | 11/1981 | United Kingdom ........... 73/49.2 R |
| 2164453 | 3/1986 | United Kingdom . | |

Primary Examiner—Parshotam S. Lall
Assistant Examiner—S. A. Melnick
Attorney, Agent, or Firm—Carl A. Forest

[57] ABSTRACT

A sealing surface finish leak detector comprises a test fitting, a source of pressure regulated gas, means for coupling the source of gas to an aperture in the test fitting to deliver the gas to the container at an inspection site, and means for limiting the rate of flow of the gas from the source into the container. The pressure in the container is sampled a predetermined time after the gas begins to flow into the container. The predetermined time is short enough and the rate of flow of the gas into the container low enough so that the pressure in the container at the predetermined time is well below the source pressure even if the container is properly sealed. An average size leak between the sealing surface and the test fitting results in a significantly reduced pressure or rate of pressure rise in the container at the predetermined time.

4 Claims, 5 Drawing Sheets

CONTAINER INSPECTION APPARATUS

This is a continuation of co-pending application Ser. No. 946,411 filed on Dec. 24, 1986, now abandoned.

BACKGROUND OF THE INVENTION

The invention relates generally to leak detectors for containers and deals more particularly with an apparatus for testing the sealability of the mouth of a container.

A wide variety of surface finish leak detectors were previously known such as those disclosed in U.S. Pat. Nos. 3,496,761 and 4,490,800. These detectors inspect the surface of a bottle mouth as the bottle is fed by a conveyor or auger screw to an inspection site located beneath the detector. The detector of U.S. Pat. No.3,496,761 includes a test fitting which is lowered into engagement with the mouth of the bottle at the inspection site and forms an air-tight seal if the bottle mouth is properly formed-smooth, flat and generally horizontal; otherwise, a leak results. The sealability of the bottle mouth by the test fitting mimics the sealability of the bottle mouth by a cap or other type of commercial seal.

In the various leak detectors previously known, air is injected into the bottle and pressure is sensed according to a variety of schemes. For example, in U.S. Pat. No. 3,496,761 a metered volume of air is injected into the container by a piston and cylinder assembly which forms a pump. At the conclusion of the discharge stroke of the piston and cylinder assembly, while the test fitting still closes the mouth of the container under test, the air pressure retained in the container is gauged to determine whether an excessive leakage takes place due to imperfections in the container mouth. While this system is effective in detecting flaws in the surface of a bottle mouth, it is limited in the rate at which it can inspect bottles. Also, the differences in pressure between good bottles and leakers varies with the amount of time available after the metered volume of air is injected in the bottle for the apparatus to subsequently measure the pressure in the bottle.

Accordingly, a general object of the present invention is to provide a detector to sense the sealability of a container mouth which detector is reliable and accurate and provides a high throughput.

A more specific object of the present invention is to provide a detector of the foregoing type which is reliable over a wide range of bottle throughputs.

Another specific object of the present invention is to provide a leak detector of the foregoing type which is reliable over a wide range of container capacities.

Another general object of the present invention is to provide a high speed detector to sense other types of leaks in containers.

SUMMARY OF THE INVENTION

The invention resides in improved apparatus for testing the mouth of a container for sealing surface defects. The improvement may be used with an apparatus having a standard test fitting with an aperture passing therethrough to communicate with the interior of a container and a means for moving the test fitting into engagement with the mouth of the container at an inspection site. The improvement comprises a source or pressure regulated gas, a means for coupling the source to the aperture in the test fitting to deliver the gas to the container at the inspection site, and a means for limiting the rate of flow of said gas from the source into the container. According to one feature of the invention, means are provided for sampling the approximate pressure in the container a predetermined time after the test fitting engages the container mouth and the gas begins to flow into the container. The predetermined time is short enough and the means for limiting the rate of flow of the gas is limiting enough so that at the predetermined time, the pressure in a properly sealed container will be well below the source pressure.

According to another feature of the invention, a multiplicity of such containers are sequentially passed to and through said inspection site for defect detection at a wide range of conveyor speeds, and the predetermined time is the same regardless of the conveyor speed.

According to another feature of the invention, an electronic means automatically determines the approximate rate of pressure rise in the container to identify an unacceptable leak based on a reject standard.

DETAILED DESCRIPTION OF THE PREFERRED EMBODIMENT

Figure 1:
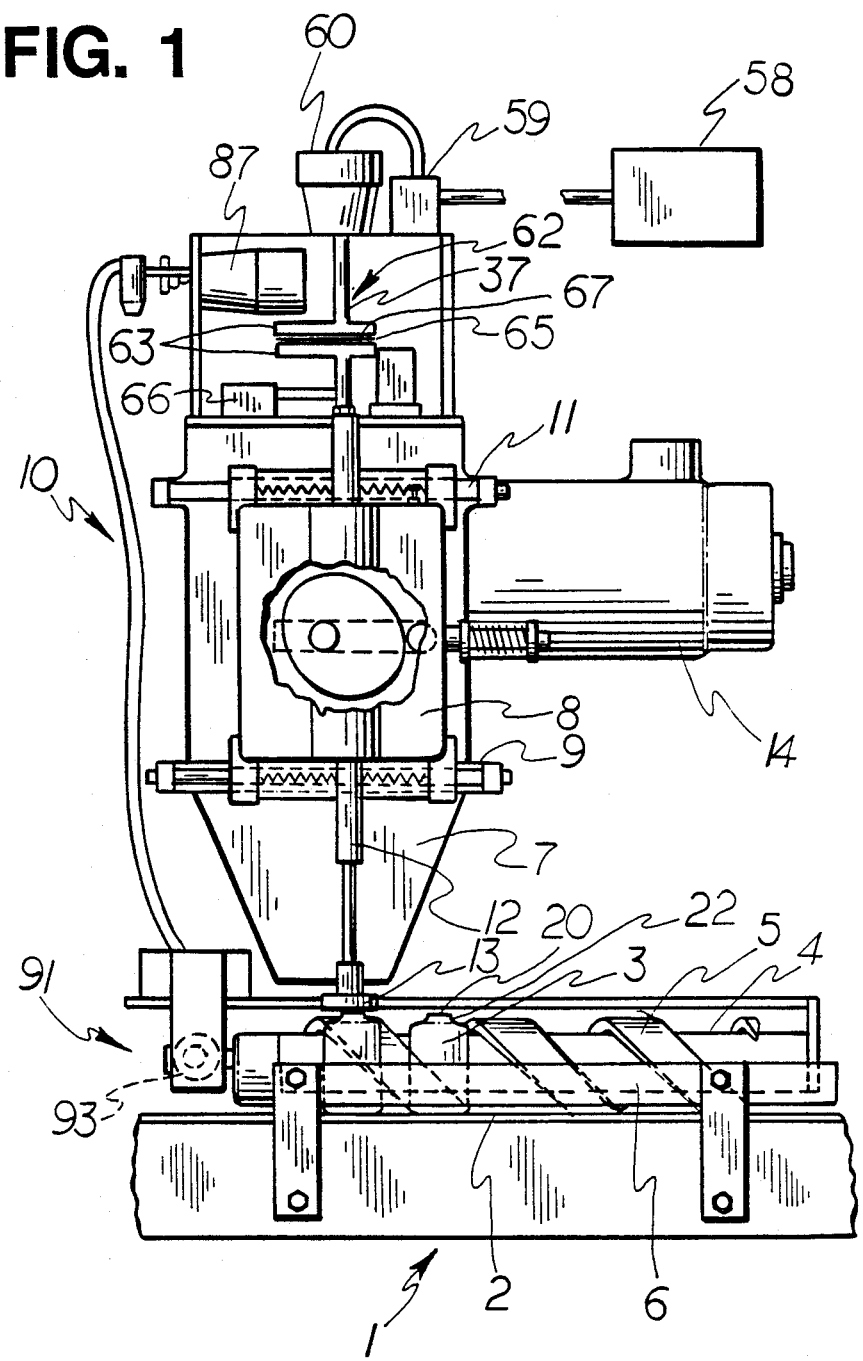
FIG. 1 is a plan view of a leak detector embodying the present invention.

FIG. 1 illustrates a finish leak detector generally designated 10 in which the invention is embodied and a frame 1 on which a link-type conveyor belt 2 is mounted for horizontal movement from right to left. A series of containers 3 to be tested, here shown in the form of glass bottles, are brought into the testing area by the conveyor 2, and are transversed through the testing area at uniform speed and in accurately spaced relation by a rotating cylinder 4 having a spiral thread 5 of appropriate pitch to receive and traverse the containers as they are held in the thread spaces by means of a spring mounted guide rail 6.

The detector 10 includes a support plate 7 fixedly mounted on the frame 1, and a carriage member 8 mounted thereon with freedom for limited horizontal sliding movement on guide bars 9 and 11. A tubular telescopic plunger 12 is mounted for vertical movement in the carriage 8, directly above the path of the containers 3, and a test fitting 13 is detachably mounted on the lower end of the plunger in position to be brought into engagement with an upper surface 20 of a mouth 22 of a container by downward movement of the plunger. The test fitting 13 has an orifice which communicates with the interior of the container 3.

Means including a motor 14 is provided for rotating the threaded cylinder 4 to traverse the container through the test area, for reciprocating the plunger 12 to move the test fitting into and out of engagement with a container as it moves through the test area, and for sliding the carriage 8 to cause the plunger and test fitting to travel in unison with the container as long as the test fitting is in engagement therewith. For more details of many parts of the detector 10 reference may be made to U.S. Pat. No. 3,496,761 and 4,490,800, which patents are assigned to the assignee of the present invention and hereby incorporated by reference as part of the present disclosure.

Figure 2:
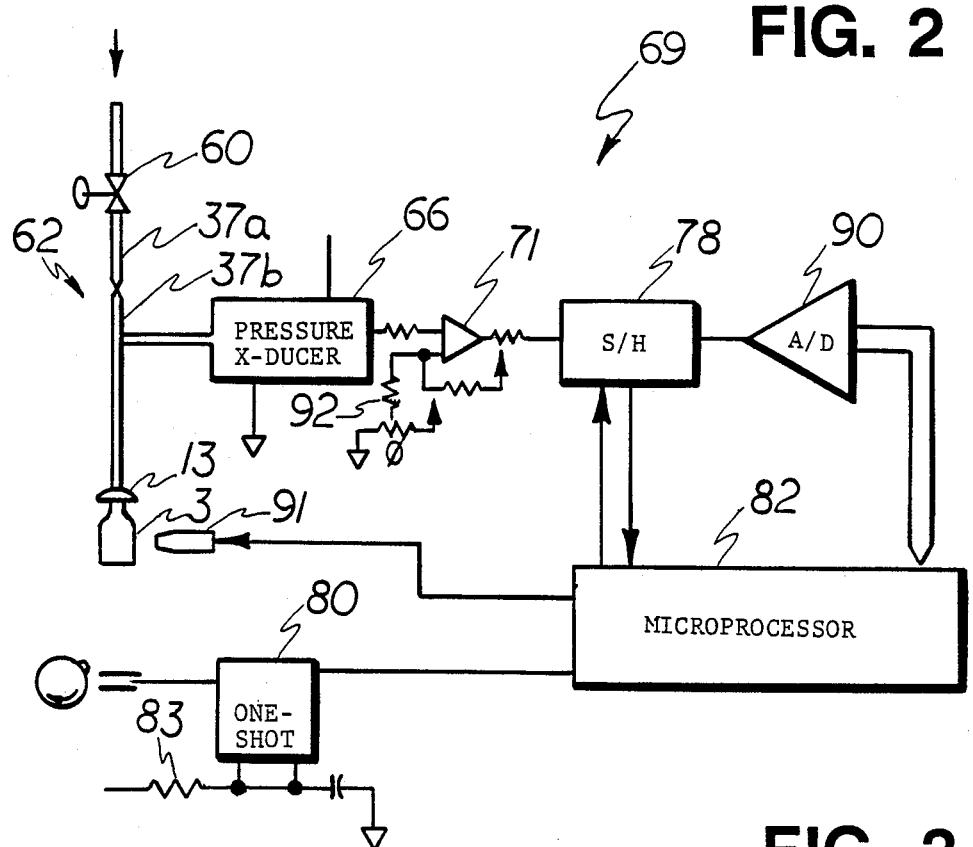
FIG. 2 is a schematic block diagram of key components of the leak detector of FIG. 1.

Focusing now on the present invention, the apparatus 10 also includes a pressure regulator 60 supplied by a remote compressor 58 coupled through a fitting 59, and a fluid flow restrictor 62 which controls the flow of air through a hose 37 as illustrated in FIGS. 1 and 2. By way of example, the regulator 60 is a Precision "Norgren" which regulates the air to eight pounds per square inch. Such is the pressure within the section 37a of the hose 37 upstream of the flow restrictor 62. The section 37b is downstream of the restrictor 62 and is connected at its other end to the test fitting 13 in communication with the orifice.

The flow restrictor 62 comprises two ferrule fittings 63, 63 which receive the hose section 37a and 37b, and a plate 65 supported between the two fittings. The plate has an orifice 67 which by way of example is 1/16 inch diameter which limits the rate of air flow through the hose 37. Preferably, the orifice diameter is in the range of ⅛ inch to 1/32 inch.

When the test fitting 13 is lowered onto the surface 20 of the bottle 3, air flows into the bottle at a constant rate which is gradual as compared with the inspection cycle. The rate of pressure build-up within the bottle resulting, from such gradual inflow of air is logarithmic as illustrated by a curve 68 in FIG. 3 for a properly sealed bottle. Because of the restrictor 62, the curve has a relatively long rise time compared to a fixed, sample time 70. The sample time is the time after the detector 10 begins to inject air into the bottle at which the surface leak detector measures the pressure within the bottle 3, and by way of example, the sample time equals 95 milliseconds. In keeping with the objects of the time invention, the detector 10 is able to accommodate a wide range of bottle throughputs so that the sample time 70 is slightly less than the total inspection time available at the largest throughput.

The size of the orifice 67 and the characteristics of the pressure regulator 60 are chosen such that the pressure in the bottle 3 at the sample time does not reach the steady state pressure of the regulator 60 (in the aforesaid example 8 psi) even if the bottle is properly sealed. Preferably also, the sample time is set to correspond with a bottle pressure in a properly sealed bottle which is less than two-thirds and more preferably less than or approximately half the pressure available from the regulator 60 for a properly sealed bottle to optimize the sensitivity of the system. In the aforesaid example, the pressure in a properly sealed 12 ounce bottle will rise to approximately 4 psi at the sample time 70. The fixed sample time also insures that the same segment of the pressure rise curve is utilized regardless of the throughput.

Figure 3:
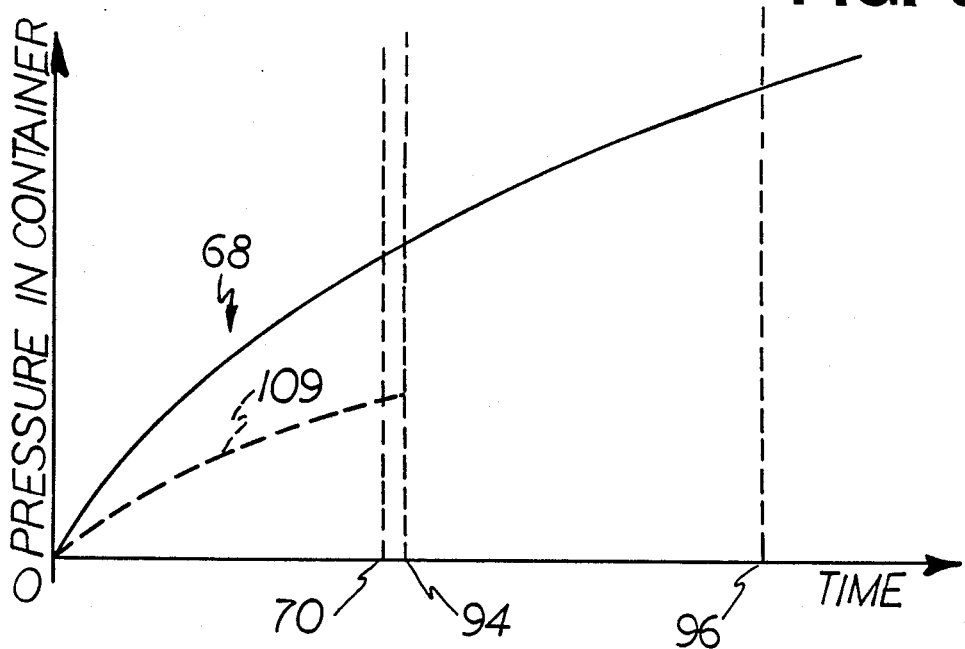
FIG. 3 is a graph illustrating the pressure rise in a container having a proper sealing mouth which pressure rise is due to injection of air by the leak detector of FIG. 1 into the bottle.

The flow reducing device 62 is also chosen such that an average size leak in the surface finish of the bottle causes a significant reduction in the net flow of air into the bottle and a substantial decrease in the slope of the pressurizing curve 68. Consequently, the pressure resulting in the bottle at the sample time for a leaky bottle is substantially less than that of a properly sealed bottle. Preferably, the pressure within the bottle at the sample time for a bottle having an average size leak area of 0.0039 square inches, is less than two-thirds the pressure of regulator 60 and more ideally approximately one-half or less than the pressure of regulator 60 resulting at the sample time within a properly sealed bottle. In the aforesaid example, the bottle 3 has an average size leak and is pressurized to two psi at the sample time 70 as indicated by a broken line 109 in FIG. 3 illustrating the rise in pressure in the bottle. The flow reducing device 62 also reduces the consumption of compressed air for economy.

Because the size of the flow reducing device 62 is selected in accordance with the size of an average leak, and the size of an average leak is approximately constant regardless of bottle capacity, neither the flow reducing device 62 nor the regulator 60 need be changed for different bottle capacities. However, if desired the orifice in the flow reducing device 62 maybe increased for relatively large capacity bottles.

The bottle pressure is sensed by a pressure transducer 66 which is coupled to the hose segment 37b, and yields an electrical signal having a magnitude proportional to the pressure within the hose segment 37b and the bottle 3. The output of the pressure transducer 66 is fed to an amplifier 76 which amplifier output is connected to a sample and hold circuit 78. The sample and hold circuit 78 is triggered by a micro-processor 82 at the sample time 70. The sample time 70 is either set by a fixed resistor 83 or manually adjustable by a potentiometer to correspond to the type of machine performing the inspection and control a pulse width produced by a one-shot 80. A cam 84 coupled to the conveyor belt transmits an enabling pulse to the one-shot 80 when the fitting 13 contacts the bottle 3. The microprocessor 82 triggers the sample and hold circuit 78 when the one-shot 80 pulse times out.

The analog voltage stored in the sample and hold circuit 78 after each sample time 70 is sensed by an analog to digital converter 90, the output of which is fed to the micro-processor 82. The micro-processor 82 compares the bottle pressure indicated by the analog to digital converter 90 to a predetermined standard and if it is less, transmits a signal to a bottle rejector 91. The bottle rejector is located slightly downstream from the inspection stie and may comprise a source of pressurized air 87 and a nozzle 93 aimed across the conveyor to intercept the defective bottle.

The gain of the amplifier 76 is optionally controllable by a feedback potentiometer 92 to utilize the full range of the analog to digital converter 90. As discussed above, the pressure resulting in a good bottle at the sample time 70 is a function of the bottle capacity. The adjustment to the gain of the amplifier 76 also optionally allows the usage of a single standard within the micro-processor 82 for comparison to the actual bottle pressure as noted above.

FIG. 3 also shows the rise in pressure within the bottle 3 after the sample time 70. A time 94 is the time that the test fixture 13 is lifted from the bottle mouth 4 when the bottle throughput is maximum and a time 96 is the time that the test fixture 13 is lifted from the mouth of another bottle 3 at a lower throughput. However, it is not necessary that any further samples be taken of the bottle pressure after the sample time 70 in either case.

Figure 4:
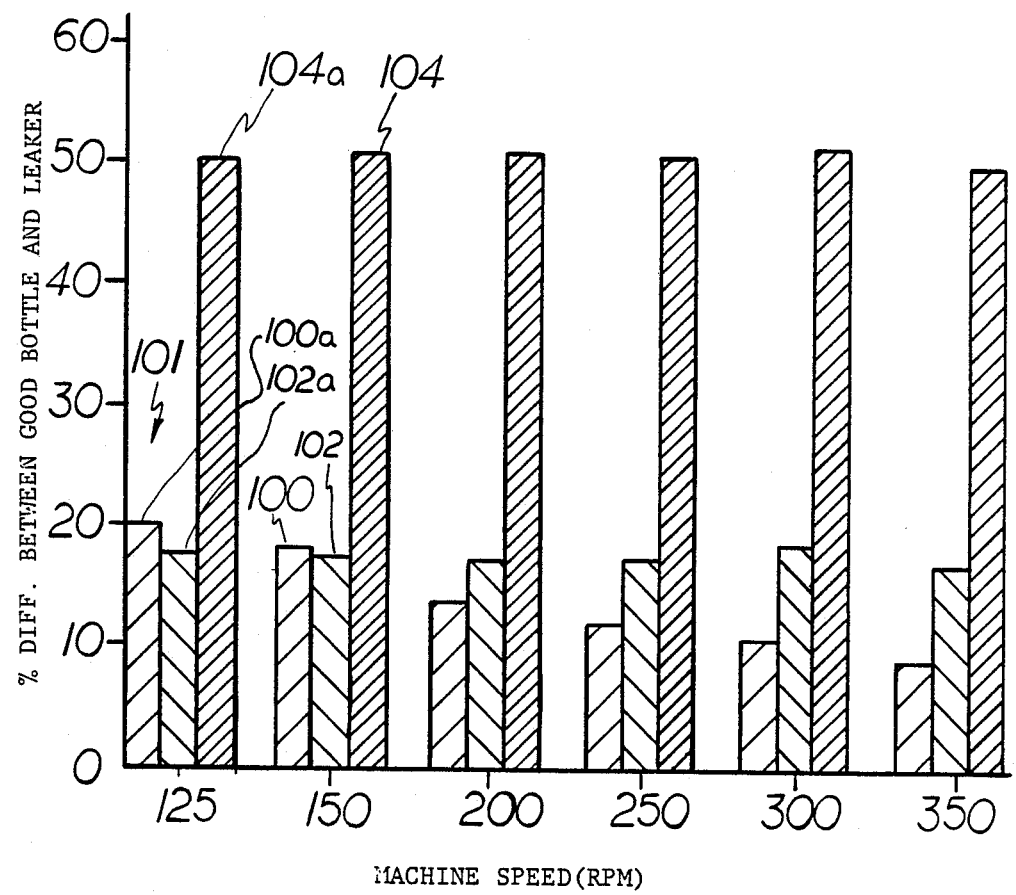
FIG. 4 is a bar graph illustrating the performance of the leak detector of FIG. 1 and that of prior art U.S. Pat. No. 3,496,761.

FIG. 4 illustrates the performance of the finish leak detector 10 in comparison to a prior art system similar to that disclosed in the U.S. Pat. No. 3,496,761. The test is performed on twelve ounce bottles having a 0.0039 square inch leak. A first bar 100a of the first triplet 101 represents the pressure differential between a good bottle and a leaky bottle at the sample time in U.S. Pat. No. 3,496,761 system at a relatively low throughput, 125 bottles per minute. In the illustrated embodiment, the pressure differential of 20% is good. A second bar 102a of the aforesaid triplet illustrates the pressure differential between a good bottle and a leaky bottle when inspected by the present finish leak detector 10 without the adjustment to the gain of the amplifier 76 to fully utilize the range of the analog to digital converter 90. The pressure differential of approximately 17% is also good. A third bar 104a of the first triplet illustrates the pressure differential between a good bottle and leaky bottle as measured by the present finish leak detector 10 after an adjustment to the gain of the amplifier 76 to fully utilize the range of the analog to digital converter 90. The resultant pressure differential of approximately 50% is much better than either of the foregoing.

The subsequent triplets in FIG. 4 illustrate that for increased throughput, the pressure differentials as measured by the prior art system of U.S. Pat. No. 3,496,761 steadily decrease to a level of approximately 10% at 350 bottles per minute whereas the pressure differential for the present finish leak detector 10 without adjustment of the gain of the amplifier 76 remains approximately in the range of 16–18% and the pressure differential of the present finish leak detector 10 after adjustment to the gain of amplifier 76 remains high and within the range of 50–53%. This illustrates the improved performance provided by the present finish leak detector 10 as compared to the prior art system.

It should also be noted that the leak detector 10 measures other types of leaks such as holes in the container.

Figure 5:
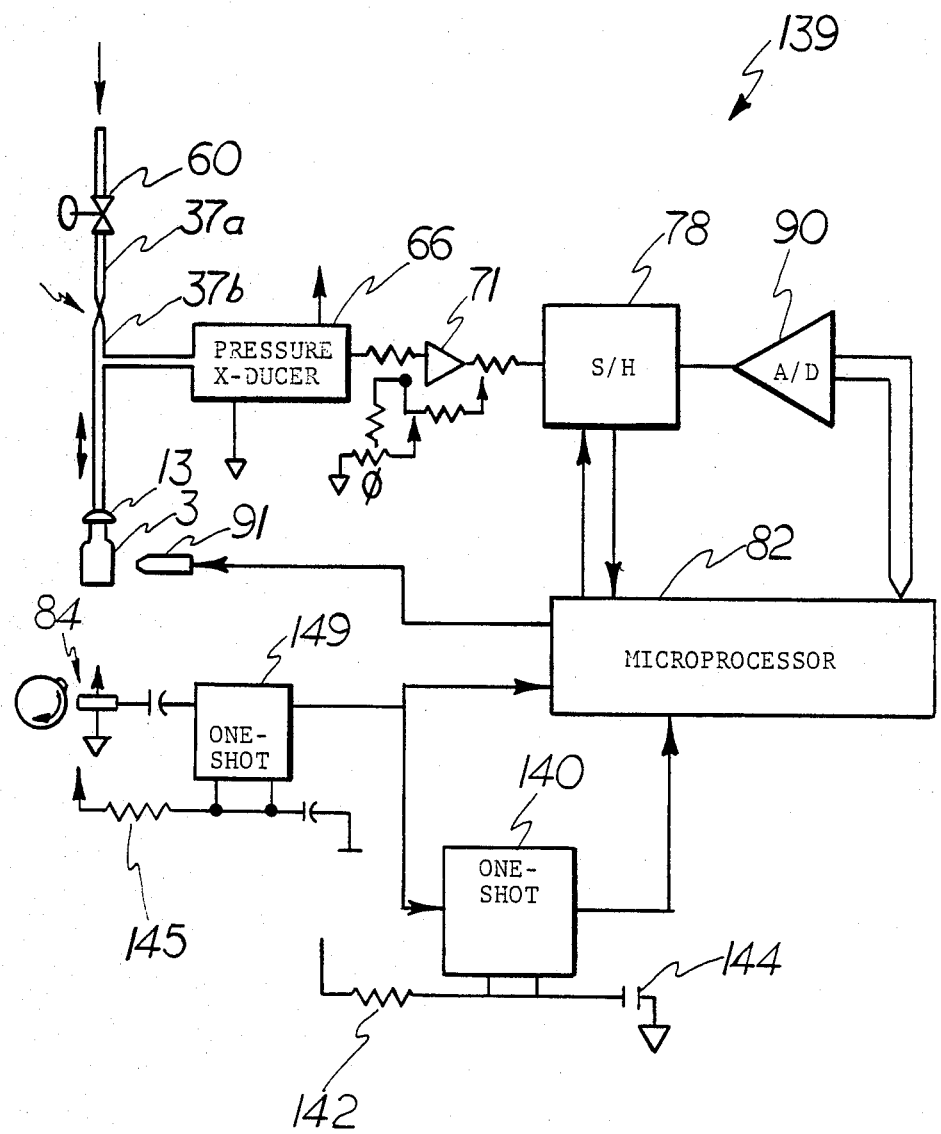
FIG. 5 is a schematic block diagram of key components of another leak detector embodying the invention.

FIG. 5 illustrates another leak detector generally designated 139 which embodies the invention. The leak detector 139 is similar to the leak detector 10 with like reference numerals indicating like components and with the following changes.

A one-shot 149, while being triggered by the cam 84 in the manner noted above, generates a shorter pulse width than in the leak detector 10 because of a resistor 145 which has a lower value than the resistor 83. By way of example, the one-shot 149 in the leak detector 139 generates a pulse having a width of 75 milliseconds. The termination of the pulse is detected by the microprocessor 82, at which time the microprocessor 82 triggers the sample and hold circuit 78. Shortly thereafter, the microprocessor 82 notes the corresponding voltage via the analog to digital converter 90. The termination of the pulse produced by the one-shot 149 also triggers a one-shot 140 which has a timing resistor 142 and timing capacitor 144. By way of example, the one-shot 140 produces a pulse having a width of 20 milliseconds, and the termination of which pulse is sensed by the microprocessor 82. In response, the microprocessor 82 again triggers the sample and hold circuit 78 to make another pressure reading.

Next, the microprocessor 82 is programmed to determine the approximate rate of pressure rise in the container between the two sample times indicated by the termination of the pulses from the one-shots 149 and 140. Because this portion of the pressure rise curve is approximately linear, one way of measuring such approximate rate of pressure rise is simply to subtract the two pressures and divide the difference by the amount of time between such pressure readings.

Figure 6:
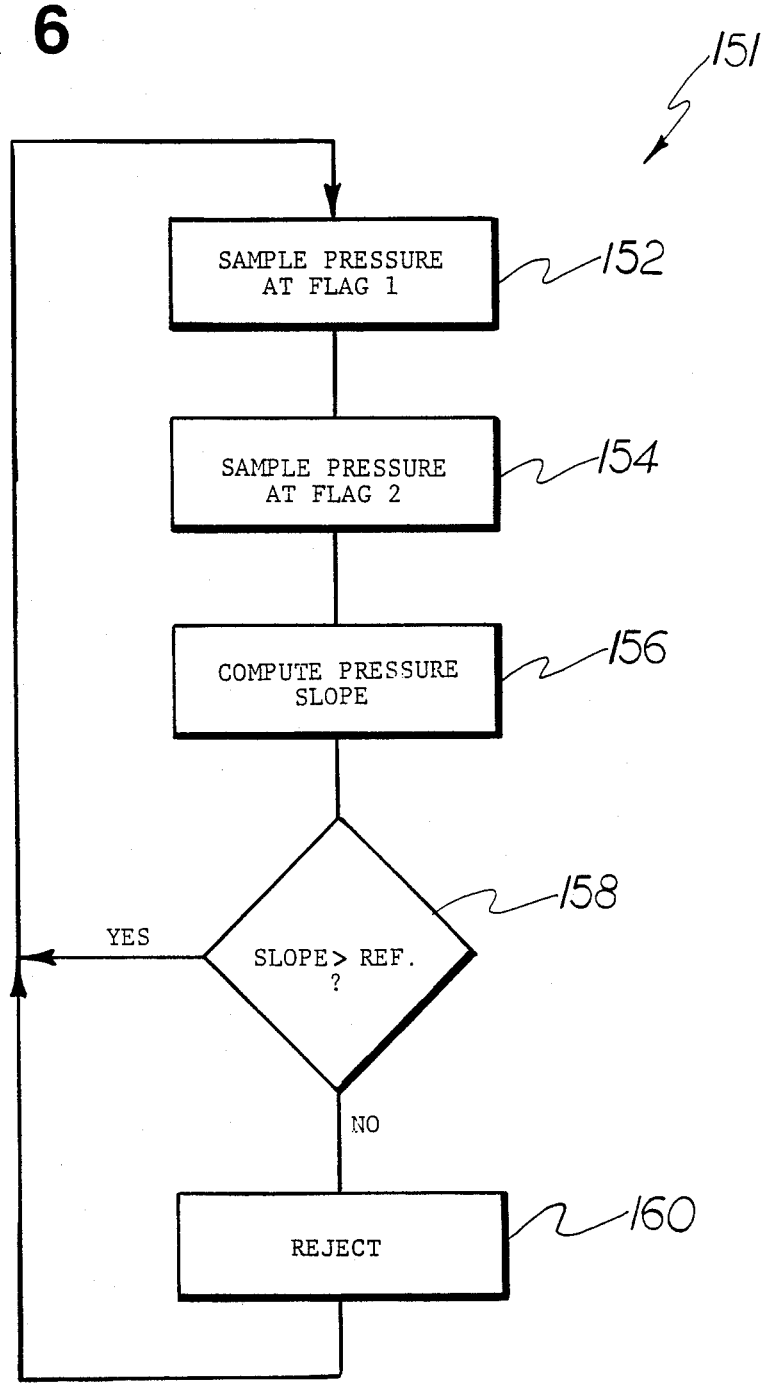
FIG. 6 is a flowchart of a computer program utilized in the FIG. 5 embodiment.

FIG. 6 illustrates a computer program 151 within the microprocessor 82 which implements the foregoing. The termination of the pulse of the one-shot 149 sets a flag 1 which is sensed by the microprocessor 82 to initiate the first pressure sampling (step 152). The termination of the pulse from the one-shot 140 sets a flag 2 which indicates the time for the second pressure sampling (step 154). Next, in a step 156, the microprocessor 82 computes the pressure slope or other aspect of the pressure rise curve by the foregoing method or other standard method. If the slope is greater than a predetermined reference standard, the container is acceptable, but if it is not, this indicates a leak and a defective bottle (step 158). Consequently, the microprocessor 82 sends a reject signal to the rejector 91 (step 160).

The leak detector 139 has certain virtues. It is difficult in most systems to determine the precise moment that the test fitting 13 makes contact with the container 3 and such contact time varies with differences in the container height. While such variations effect the actual pressure measured at any sample time, it is not a significant factor in the leak detector 139 because the leak detector 139 is interested in a pressure differential between two sample times and such differential is not significantly effected by a nearly equal offset to each of the pressure samples. In addition, in the leak detector 139, the rate of pressure rise or for that matter, the pressure rise curve may be determined sooner than in the leak detector 10 based on the foregoing method for calculating the pressure differential or other more complex, but standard methods for estimating a logarithmic curve from a limited number of samples. Therefore, the leak detector 139 may accommodate an even greater throughput than the leak detector 10.

By the foregoing, finish leak detectors embodying the present invention have been disclosed. However, numerous modifications and substitutions may be made without deviating from the scope of the invention. For example, if desired, a simple analog comparator may be substituted in the circuit of FIG. 2 for the analog to digital converter 90 and the micro-processor 82 with one input of the comparator connected to the output of the sample and hold detector 78, the other input of the comparator connected to a predetermined threshold and the output of the comparator connected to the input of the rejector 91. Also if desired, the sample time can be adjusted in accordance with the throughput, such that for lower rates at throughput, the sample time is increased. Therefore, the invention has been disclosed by way of illustration and not limitation, and reference should be made to the claims to determine the scope of the invention.

We claim:

1. A testing apparatus for pressure testing a container so that containers having imperfections at the sealing surface of the container opening which will result in leaks when a cap is secured thereto can be identified comprising test head means having surface means for sealing the opening of a container, means for displacing said test head means from a remote position to an operative position whereat said surface means can sealing engage the container opening, means for delivering air under pressure through said test head means to the container when said test head means is at said operative position so that the pressure within the container will increase to a steady state pressure which will be higher for a container which has no imperfections at the sealing surface than for a container which has imperfections at the sealing surface, means for sampling the pressure within the container at a selected time following the commencement of delivery of air under pressure thereto, said time being selected so that the sampling will take place below the steady state pressure of the container whether the container leaks or not, means for comparing the sampled pressure to a standard, and means for rejecting the container if the sampled pressure does not agree with said standard.

2. A testing apparatus according to claim 1, wherein said delivering means comprises means for delivering air under a pressure selected so that the pressure within a container having an average size leak will be about two-thirds the pressure in a leak free container at the sampling time.

3. A testing apparatus according to claim 1, wherein said sampling means comprises a pressure transducer in fluid communication with the interior of the container, an amplifier connected to the output of said pressure transducer, a sample and hold circuit connected to the output of said amplifier, and an analog-to-digital converter connected to the output of said sample and hold circuit.

4. A testing apparatus according to claim 1, wherein said predetermined sampling time is approximately 95 milliseconds.

* * * * *